(12) United States Patent
Mori (10) Patent No.: US 7,957,033 B2
(45) Date of Patent: Jun. 7, 2011

(54) PRINT CONTROL OPERATIONS

(75) Inventor: Hiromi Mori, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1195 days.

(21) Appl. No.: 11/584,014

(22) Filed: Oct. 20, 2006

(65) Prior Publication Data

US 2007/0109607 A1     May 17, 2007

(30) Foreign Application Priority Data

Oct. 20, 2005   (JP) ................. 2005-305276

(51) Int. Cl.
*H04N 1/40* (2006.01)
*G06K 15/00* (2006.01)
*G06K 9/00* (2006.01)
*G06K 9/36* (2006.01)

(52) U.S. Cl. ...... 358/3.28; 358/1.14; 382/100; 382/232; 382/305

(58) Field of Classification Search ................. 358/3.28, 358/1.14; 382/100, 232, 305; 399/81, 382, 399/366

See application file for complete search history.

(56) References Cited

U.S. PATENT DOCUMENTS

| 7,027,179 B2 | 4/2006 | Mori | |
| 7,450,895 B2* | 11/2008 | Oomura et al. | 399/366 |
| 2004/0258277 A1* | 12/2004 | Ueda | 382/100 |
| 2006/0158688 A1 | 7/2006 | Mori | |

FOREIGN PATENT DOCUMENTS

| JP | 11-105367 | 4/1999 |
| JP | 11-296334 | 10/1999 |
| JP | 2001-328325 | 11/2001 |

* cited by examiner

*Primary Examiner* — Charlotte M Baker
(74) *Attorney, Agent, or Firm* — Banner & Witcoff, Ltd.

(57) ABSTRACT

A print control program product comprises creating a new image file of the created printing data for a new watermark when an instruction is given to create the image file based on the created printing data, and storing the created new image file in the memory.

14 Claims, 7 Drawing Sheets

| SETTING RETAINING INFORMATION | |
|---|---|
| FOR INTERNAL USE ONLY | 108b (108) |
| ⋮ | |
| COPY | 108c (108) |
| ⋮ | |
| CONFIDENTIAL | 108d (108) |
| ⋮ | |
| FORM OVERLAY 1 | 108a (108) |
| Strings = | |
| Font = | MS P GOTHIC |
| Size = | 24 |
| Style = | 0 |
| BackOrFore = | 1 |
| TransparentLevel = | 0 |
| Angle = | 0 |
| AutoCenter = | 0 |
| x = | 0 |
| y = | 0 |
| Scale = | 100 |
| File = | C:¥myoverlay¥overlay001.bmp ← Path |

FIG. 3

FIG. 4
(PROCESS TO BE EXECUTED BY PC)

PRINT CONTROL OPERATIONS

CROSS-REFERENCE TO RELATED APPLICATION

This application claims priority from Japanese Patent Application No. 2005-305276, filed on Oct. 20, 2006, the entire subject matter of which is incorporated herein by reference.

TECHNICAL FIELD

Aspects of the present invention relate to a print control program product to be executed in a computer in order to output data to a printing apparatus such as a printer, and more specifically to a print control program product which can solve a troublesome operation when image data is stored as a watermark.

BACKGROUND

Hitherto, a printer driver has a function to allow a printer (a printing apparatus) to print printing matter with a given stamp mark added thereto (for example, see JP-A-11-296334and JP-A-2001-328325). When printing printing matter with a stamp mark added thereto using a printer, a printer driver synthesizes, before outputting to the printer, print data such as a document or an image to be printed and an image data having a stamp mark specified by a user. This stamp mark is also hereinafter referred to as a watermark.

A watermark that is added to the printing matter by the printer driver can be, for example, character strings such as "COPY" and "FOR INTERNAL USE ONLY", or an image such as a bit map. Here, by operating the watermark setting dialog 100 (see FIG. 7A) and watermark editing dialog 120 (see FIG. 7B) of the printer driver, both of which are displayed on a liquid crystal display (which is hereinafter referred to as LCD) functioning as the display device of a personal computer (which is hereinafter referred to as PC), the user can add a desired watermark to the printing matter.

Figure 7A:
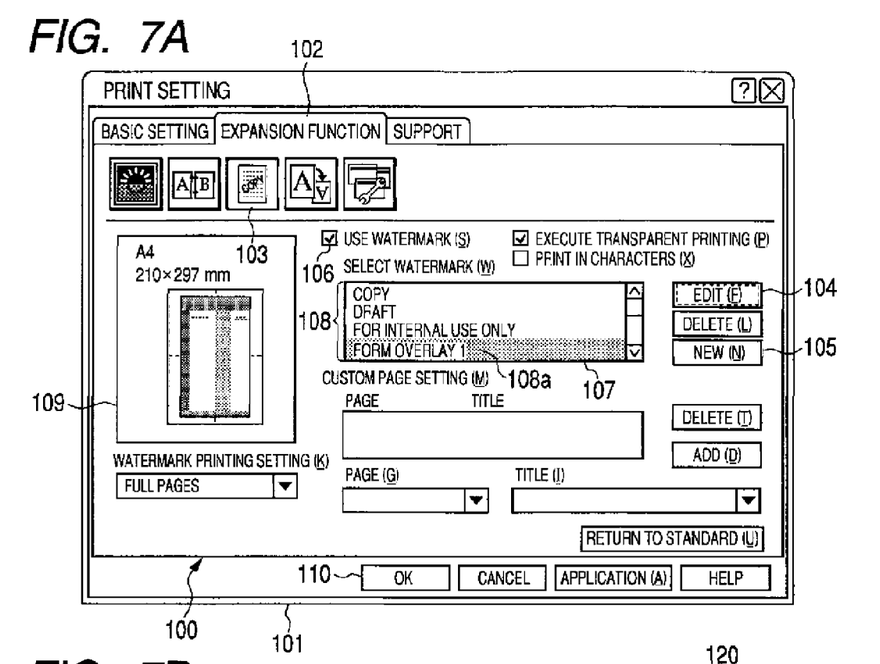
FIGS. 7A and 7B are screen views of a watermark setting dialog and a watermark editing dialog which are displayed on an LCD by a printer driver according to the related art.
Figure 7B:
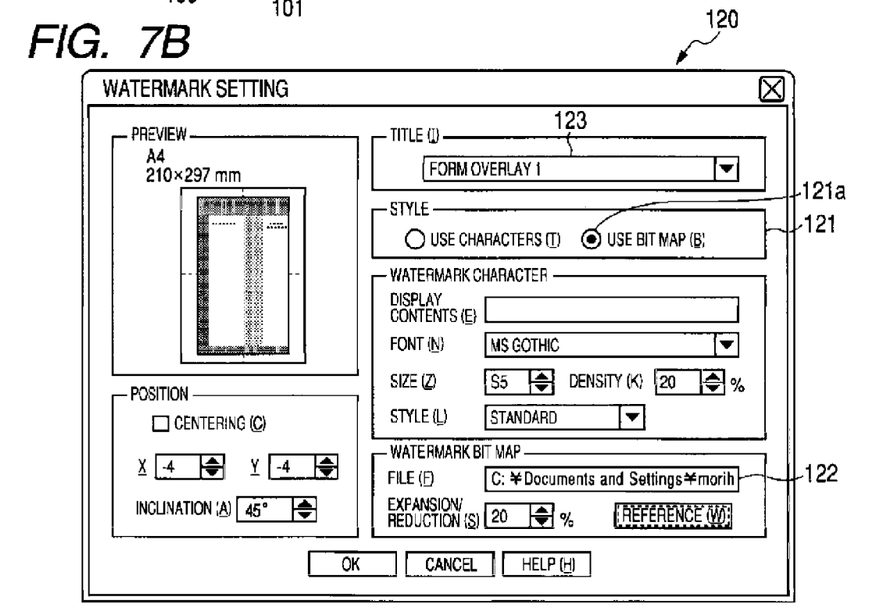

Here, description will be given below of print setting used when carrying out a printing operation for adding the watermark (which is hereinafter referred to as watermark printing) with reference to FIGS. 7A and 7B. FIGS. 7A and 7B are screen views which show a watermark setting dialog 100 and a watermark editing dialog 120 to be displayed on the LCD by the printer driver.

The watermark setting dialog 100 shown in FIG. 7A is a part of a print setting dialog 101 for setting various print settings in the printer driver, and specifically, the watermark setting dialog 100 is a dialog which, after an expansion function tab 102 in the print setting dialog 101 is selected, can be displayed on the LCD by depressing a watermark button 103. On the other hand, the watermark editing dialog 120 shown in FIG. 7B is a dialog which can be displayed on the LCD by depressing an edit button 104 or a new button 105 on the watermark setting dialog 100.

When the user desires the watermark printing, the user may check off a check box 106 in the watermark setting dialog 100 to thereby validate the watermark printing. Then, the user may choose a watermark to be added and depress an OK button 110, thereby securing the choice of the watermark printing.

Here, with further regard to the choice of the watermark, by choosing an optional one of four display titles 108 arranged in a box 107, a desired watermark can be chosen from character strings or bit map images which have been previously stored. FIG. 7A shows a state where there is chosen a display title 108a ("Form overlay 1") which corresponds to a bit map image to be displayed on a preview column 109.

Also, by using a watermark editing dialog 120 shown in FIG. 7B, a character string or a bit map image can be specified as a watermark. For example, when a bit map image is specified as a watermark using the watermark editing dialog 120, after an option button 121a in a style column 121 is chosen, a destination path of a stored location of the file of a bit map image to be displayed as a watermark is input to a box 122 and the OK button 110 is depressed. The bit map image file stored at the input destination path can thereby be specified as a watermark.

In addition to the previously stored watermarks including the four display titles 108, the user can also store character strings or bit map images as the desired watermark. For example, when a bit map image is stored as a watermark which can be chosen from the box 107, firstly, the user may depress the new button 105 in the watermark setting dialog 100 to thereby display the watermark editing dialog 120. Next, similar to a case in which the bit map image is specified as a watermark, the user may choose the option button 121a in the style column 121 and input the destination path of the stored location of the file of the bit map image. The user may then input to a box 123 a display title unique from the already existing display titles 108 and depress the OK button, whereby the bit map image file stored at the inputted destination path can be stored in the form of the inputted display title.

However, when storing a bit map not previously stored as a watermark, there is found a problem in that it is necessary to execute troublesome operations, such as, as described above, an operation (1) to find the stored destination of a desired bit map image file, and an operation (2) to input a display title that does not duplicate the display titles 108.

Further, when the user creates a desired bit map image as a watermark, there is a problem that a special application is required for use in creating a bit map image file. Also, to create the bit map image, the user must start the special application and execute various operations ranging over a plurality of steps. However, such operations are troublesome.

For example, in order to specify text data created by a document creating application as a watermark, the user must carry out the following operations: (1) capture a screen containing a page which contains the text data; (2) paste the captured image into a graphic application capable of creating a bit map image; (3) erase unnecessary portions of the bit map image using an application as needed; (4) resize the image into the size of an image usable as a watermark; and (5) assign file names to the resultant images to obtain bit map image files and retain the bit map image files in their respective given storage locations.

SUMMARY

Aspects of the invention provide a print control program which can create image data (watermark data), usable as a watermark, from print images (image data for printing), and can alleviate troublesome operations when watermark data are stored as watermarks.

DETAILED DESCRIPTION

<General Overview>

According to a first aspect of the invention, there is provided print control program product comprising: software instructions for enabling a computer connected to a printing apparatus to perform predetermined operations; and a computer readable medium bearing the software instructions; wherein the predetermined operations include: creating printing data based on at least one of a character and an image; reading out watermark data chosen from a plurality of watermark data, each of the watermark data corresponding to each of a plurality of image files stored in a memory; synthesizing the read-out watermark data and the created printing data so as to generate output data; outputting the generated output data to the printing apparatus; creating a new image file of the created printing data for a new watermark when an instruction is given to create the image file based on the created printing data; and storing the created new image file in the memory.

According to a second aspect of the invention, a plurality of new image files are created, each new image file corresponding to the printing data on each of a plurality of pages, and each new image file is stored in the memory individually.

Further, according to a third aspect of the invention, the storing step further comprises: extracting file names and titles from the memory, each file name specifying the image files stored in the memory, each title being linked with each file name; adding a new file name to the created new image file, the new file name being unique among the extracted file names of the image files stored in the memory; and adding a new title to the created new image file, the new title being unique among the extracted titles of the image files stored in the memory.

Further, according to a fourth aspect of the invention, the storing step further comprises: linking the new title with the new file name.

According to the print control program of the first aspect of the invention, as a result of execution of the printing data creating step by the computer, the printing data are created from characters or images.

When the reading step is executed by the computer to thereby read out from a memory watermark data selected from a plurality of watermark data, each of the watermark data corresponding to each of a plurality of image files stored in the memory, the printing data creating step is then executed by the computer, whereby the watermark data read out as a result of execution of the reading step and the printing data created as a result of execution of the printing data creating step are synthesized to thereby generate output data.

Next, the outputting step is executed by the computer, whereby the generated output data is output to the printing apparatus.

As the result of the above operations, in the printing apparatus, the characters or images are printed on the recording medium in such a manner that a watermark corresponding to the watermark data chosen from a plurality of watermark image data stored in a memory is added to the characters or images.

On the other hand, when instructions are given to create the image file based on the created printing data, the new image file creating step is executed by the computer, whereby a new image file of the created printing data for a new watermark data is created.

Next, the created new image file in the memory is stored.

Accordingly, when instructions are given to create the image file based on the created printing data, the new image file of the created printing data for the new watermark is created and the created new image file is then stored in the memory.

Therefore, when the characters or images are stored as the created new image file for the new watermark, a troublesome operation for capturing pages which has been necessary in the conventional print control program is omitted.

Also, by previously specifying a specific memory as the initial value of a memory where the image file is to be retained, there can be reduced time and labor to control the image file for the watermark data.

Now, according to the print control program of a second aspect of the invention, a plurality of new image files are created, each new image file corresponding to the printing data on each page are created in a number equivalent to the total number of pages.

In this case, as a result of execution of the storing step, the image files for watermark data corresponding to the plurality of pages created are stored individually by page. That is, when characters or images corresponding to the plurality of pages are inputted, the number of watermark data (image files) corresponding to the total number of pages can be stored in the memory at one time.

Hitherto, when the plurality of watermark images are stored, bit map image files are created one by one and the thus created bit map images are stored sequentially, or alternatively, existing bit map images are specified and stored one after another.

On the other hand, according to the print control program of the second aspect of the invention, without creating the files of the bit map images one at a time or without specifying the files from the existing bit map images one at a time, the plurality of watermark images can be created and stored at a time, which can facilitate the store of a plurality of watermarks.

According to the print control program of a third aspect of the invention, in the storing step which is executed by the computer, the extracting step is carried out in which, with respect to each file name specifying the image files stored in the memory, each title being linked with each file name, file names and titles are extracted from the memory.

Also, in the storing step, the new file name adding step is executed in which a new file name being unique among the extracted file names of the image files stored in the memory is added. There is also carried out the new title adding step, in which a new title being unique among the extracted titles of the image files stored in the memory, is added to the created new image file.

Further, in the storing step, the linking step is executed in which the new title is linked with the new file name.

Thus, in the storing step, when storing the watermark data obtained from the characters or images inputted by the computer, while avoiding file names and display titles that have already been stored, new file names and display titles not yet used are added and stored automatically.

Therefore, according to the print control program, there can be provided not only the effect that the user can save time and labor to find usable file names and display titles that do not duplicate the existing file names and display titles in the memory, but also the effect that the user can alleviate the operational burden when storing images for watermarks.

<Print Control Program>

Figure 1:
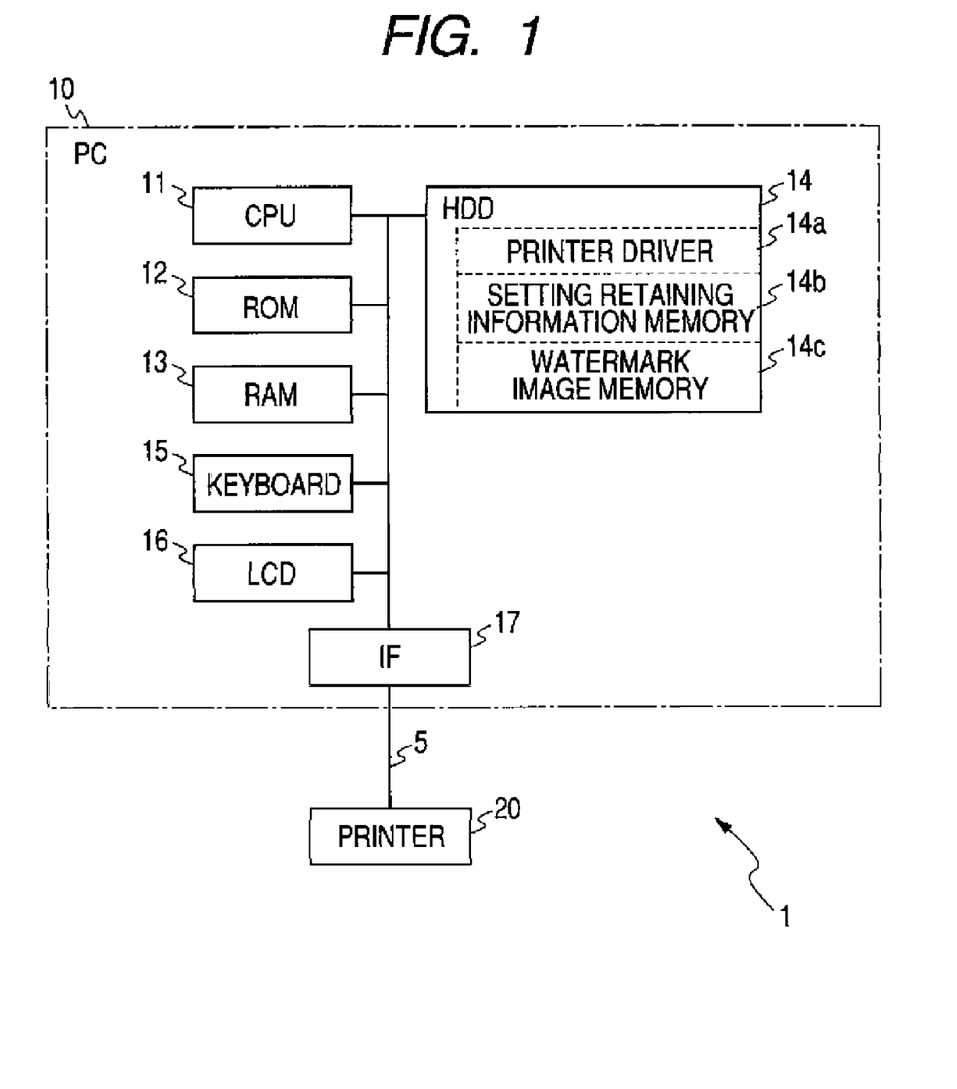
FIG. 1 is a block diagram of the electric structure of a print system according to an aspect of the invention.

Now, description will be given below of an aspect of the invention with reference to the accompanying drawings. FIG. 1 is a block diagram of the electric arrangement of a print system 1 used in an aspect of the invention. The print system 1 comprises a PC 10 which carries thereon a printer driver 14a functioning as a print control program, and a printer 20 connected through a cable 5 to the PC 10.

This print system 1 is structured such that the PC 10 executes the printer driver 14a to control the printer 20. Thus, not only the printer 20 is allowed to print watermarks, and also, from the printing images (image data for printing) of the document (characters) or images inputted by a user, there are created files for image data usable as watermarks (image data for watermarks) and setting retaining information about the stored locations of the files of the image data for watermarks and the like is stored into the setting retaining information memory 14b of the PC 10, thereby allowing the image data for watermarks to be stored as watermarks.

The PC 10 comprises a CPU 11, a ROM 12, a RAM 13, a hard disk drive (which is hereinafter referred to as HDD) 14, a keyboard 15 functioning as an input device, an LCD 16 functioning as a display device, and an interface (which is hereinafter referred to as IF) 17 which is used to transmit and receive data and the like with respect to the printer 20 connected to the IF 17 through the cable 5.

The CPU 11 is a central processing unit which controls the entire PC 10. In the ROM 12, there are stored various control programs to be executed by the CPU 11 and fixed data to be referred to when executing the various control programs. Also, the RAM 13 is a rewritable memory which includes a working area where various store groups necessary for the control programs to be executed by the CPU 11 are set, a temporary area for temporarily storing data which is under processing, and other similar areas. The RAM 13 can also be accessed randomly.

The HDD 14 is a rewritable memory which stores an operating system to be executed by the PC 10 as well as various application programs. The printer driver 14a is stored in the HDD 14, and the HDD 14 also includes the setting retaining information memory 14b and watermark image memory 14c.

Figure 4:
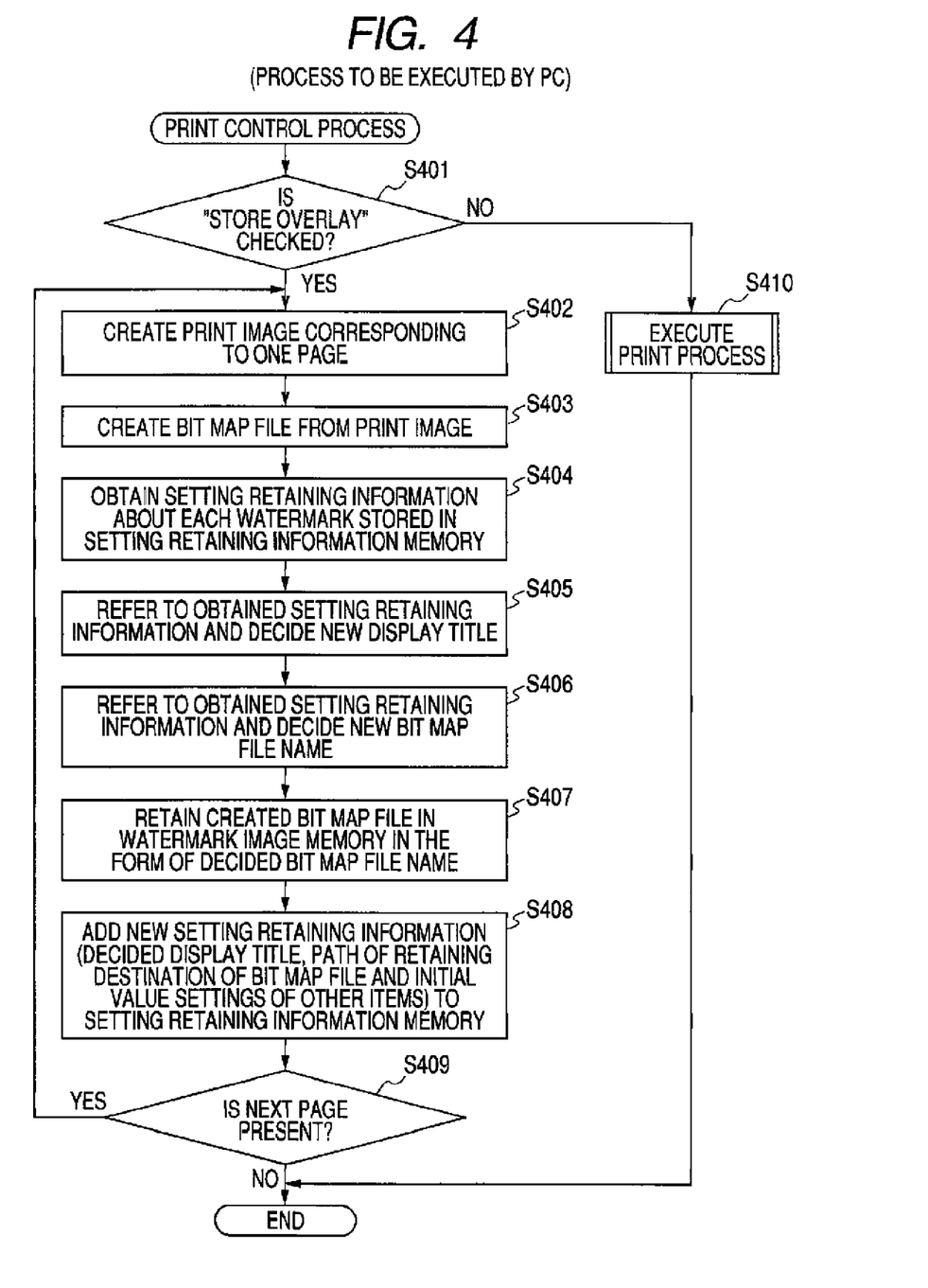
FIG. 4 is a flow chart of a print control process to be executed by a PC.
Figure 5:
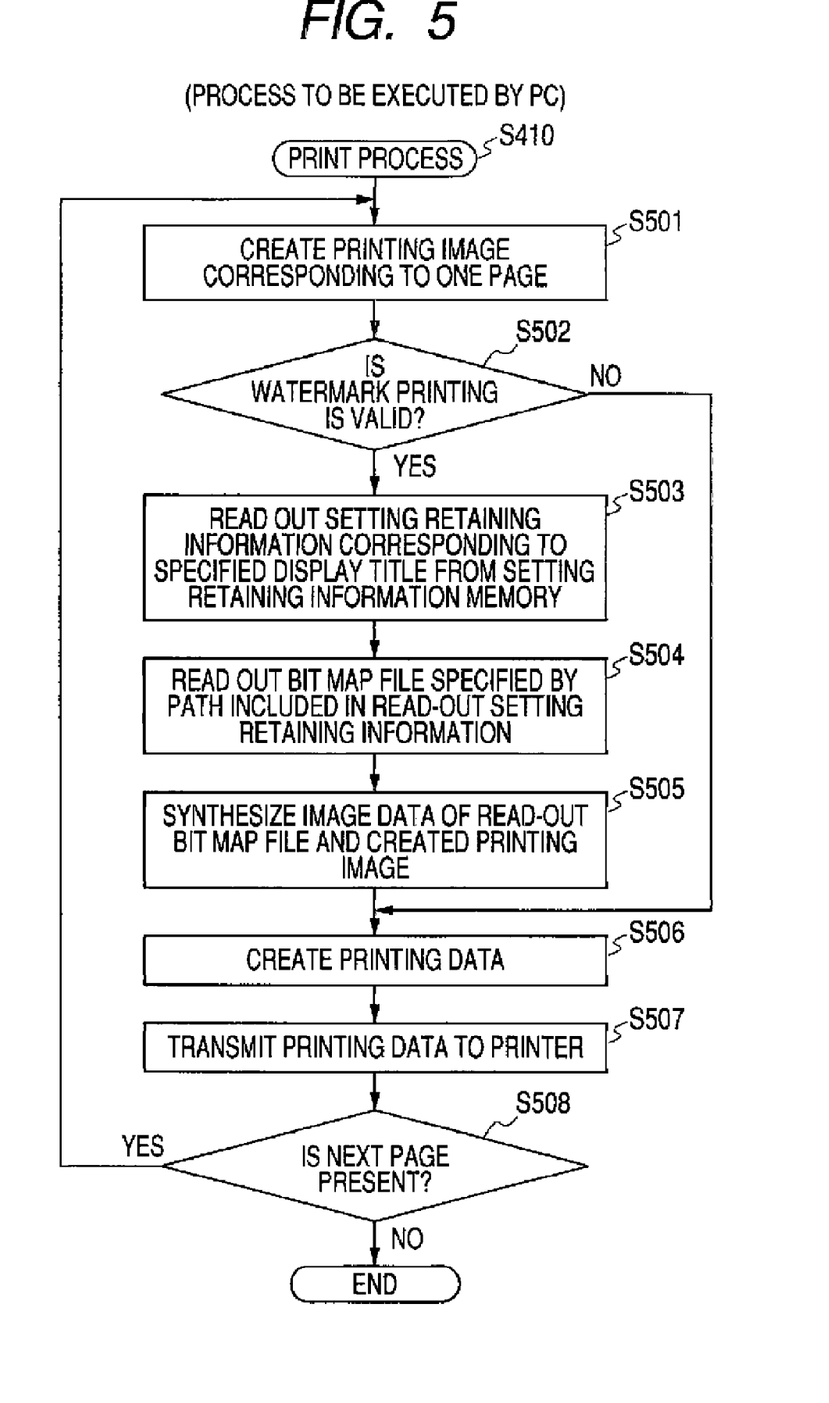
FIG. 5 is a flow chart of a print process to be executed in the print control process shown in FIG. 4.

The printer driver 14a is a driver program for the printer 20 to be connected to the PC 10, and is interposed between the application program of the PC 10 and printer 20 to help the transmission and reception of data therebetween. Incidentally, the processes respectively shown in FIGS. 4 and 5 are processes which are to be executed according to the program of the printer driver 14a.

The printer driver 14a is provided in each printer and has a function to set a printer which corresponds to (is to be controlled by) the printer driver 14a. By starting the printer driver 14a, a user when printing a watermark, not only can output a printing data with a watermark added thereto to the printer 20 to allow the printer 20 to print the watermark, but can also create a file for image data for a watermark (a bit map file) from the printing image of a document (characters) or images inputted by the user and store the setting retaining information such as the stored location of the thus created bit map file in the setting retaining information memory 14b, thereby being able to store the image data for a watermark as a watermark.

The setting retaining information memory 14b is a memory which stores, from a watermark setting dialog 140 (see FIG. 3), setting retaining information corresponding to the display titles 108 stored to be selectable by the user for each watermark (for each of the display titles 108). Incidentally, description will be given later of the specific setting retaining information to be stored in the setting retaining information memory 14b with reference to FIG. 2.

The watermark image memory 14c is a memory which, in a print control process to be discussed later (see FIG. 4), stores therein a file for image data for a watermark (a bit map file) created from the printing image of a document (characters) or from images inputted by the user.

The printer 20 is a printing apparatus which executes a printing operation according to the printing data received from the PC 10 through the cable 5. The printer 20 comprises: a control part (not shown) composed of a CPU, a ROM and a RAM; a printing means (not shown) for executing a printing operation onto a recording medium and also for delivering the thus printed recording medium; and an interface (not shown) for transmitting and receiving data or the like between the printer 20 and PC 10 connected through the cable 5 to the printer 20.

Figure 2:
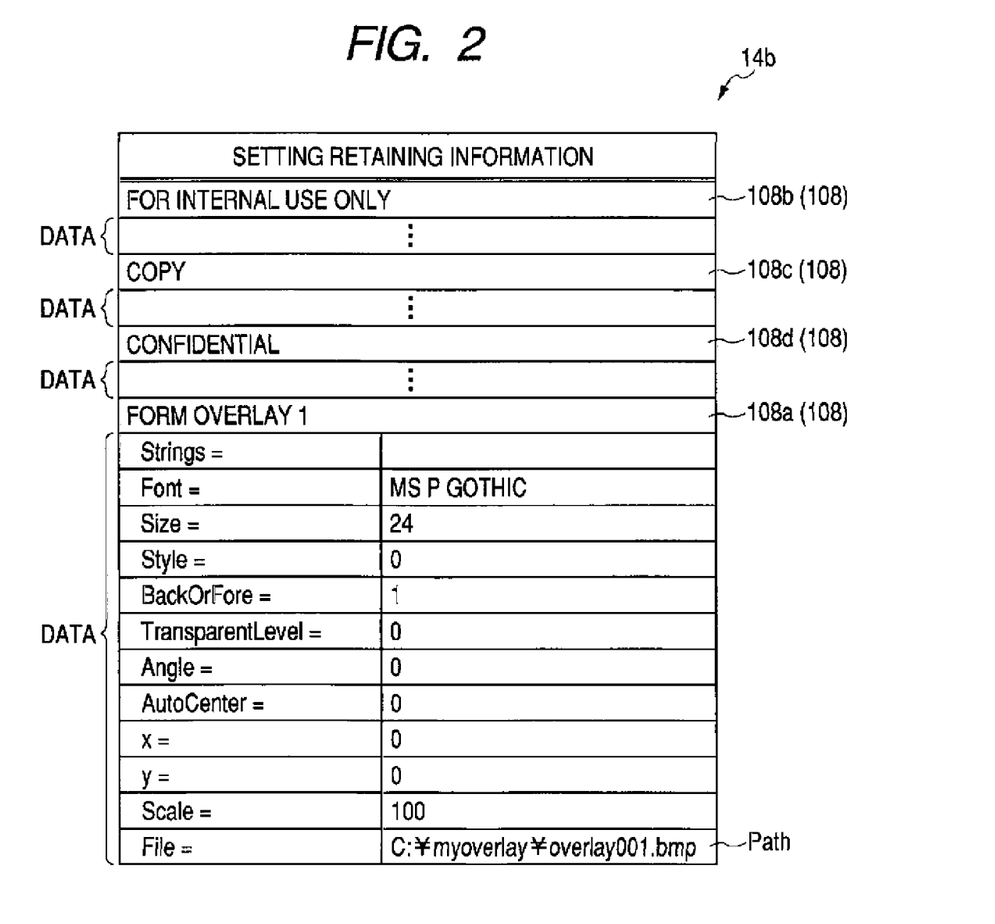
FIG. 2 shows setting/retaining information about watermarks to be stored in a setting retaining information memory.

Next, description will be given below of the specific setting retaining information to be stored in the above-mentioned setting retaining information memory 14b with reference to FIG. 2. FIG. 2 is a typical view of the setting retaining information about each of the watermarks to be stored in the setting retaining information memory 14b.

In FIG. 2, there is shown a state where four pieces of setting retaining information respectively corresponding to four watermarks are stored in the setting retaining information memory 14b. As shown in FIG. 2, in the setting retaining information memory 14b, there are stored four pieces of setting retaining information which respectively correspond to a display title 108a (Form Overlay 1), 108b (FOR INTERNAL USE ONLY), 108c (COPY), and 108d (CONFIDENTIAL), and which are respectively to be displayed on a box 107 in the watermark setting dialog 140 (see FIG. 3).

The setting retaining information given to each of the watermarks is composed of its associated display title 108 (108a to 108d) and a DATA column corresponding thereto. Incidentally, in FIG. 2, the DATA column is displayed only for the display title 108a, whereas the DATA columns corresponding to the other display titles 108b to 108d are omitted.

As shown in FIG. 2, the DATA column, when a watermark is a character string (for example, "FOR INTERNAL USE ONLY" and "COPY"), the watermark is composed of "Strings" which is a variable for expressing the data of the character string, "Font" which is a variable for expressing the kind of the font, "Size" which is a variable for expressing a font size, "Style" which a variable for expressing the kind of a character style, "BackOrFore" which is a variable for expressing whether a watermark is arranged on the front surface or not when it is superimposed on a printing image, "TransparentLevel" which is a variable for expressing a transparent density level, "Angle" which a variable for expressing the inclination of characters, "AutoCenter" which is a variable for expressing whether or not centering is necessary, "x" which is a variable for expressing the amount of movement in the x direction, "y" which is a variable for expressing the amount of movement in the y direction, and "Scale" which is a variable for expressing an expansion or compression rate. When the watermark is a bit map image, the watermark is also composed of "File" which is a variable for expressing a destination path specifying the stored location of a file for the bit map image (which is hereinafter referred to as a bit map file).

Here, when the path of the stored location of the bit map file is expressed by "C:¥myoverlay¥overlay001.bmp" as shown in FIG. 2, this shows that a bit map file having the file name of "overlay001.bmp" is retained in a "myoverlay" folder in the C drive of the PC 10.

Figure 3:
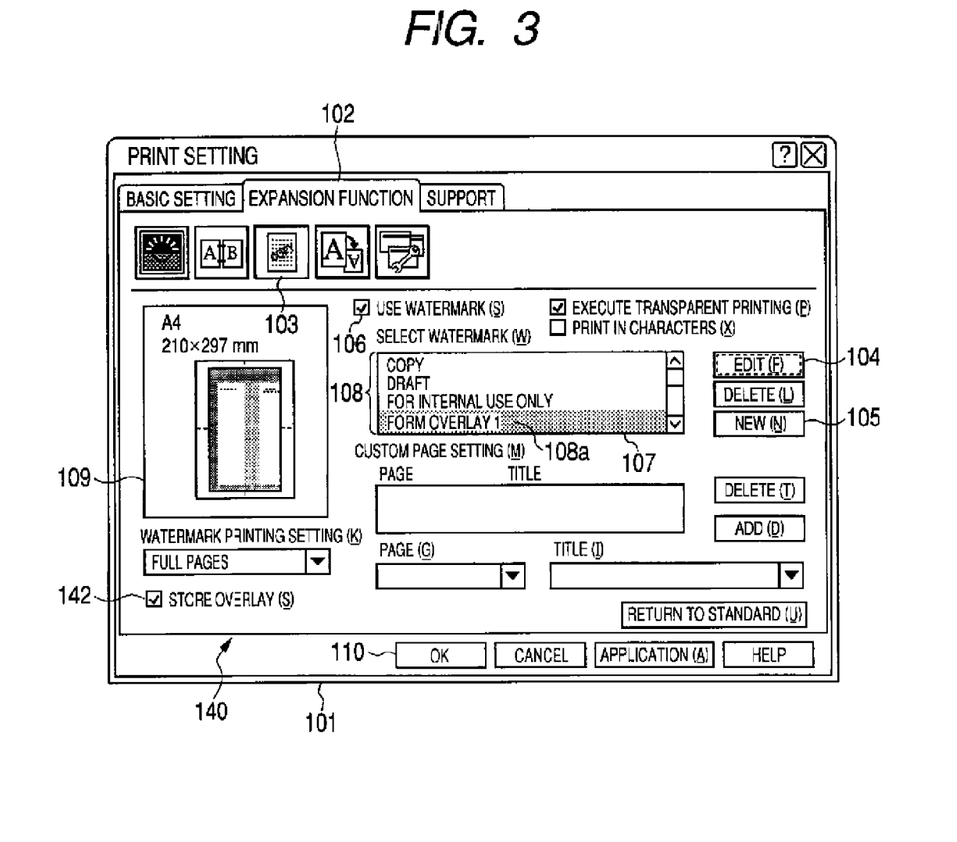
FIG. 3 is a screen view of a watermark setting dialog to be displayed on an LCD in the print system.

Next, description will be given below with reference to FIG. 3 of a setting screen (a setting dialog) relating to the watermark printing in the printer driver 14a according to the present aspect. FIG. 3 shows a screen for displaying the watermark setting dialog 140 to be displayed on the LCD 16 in the printing system 1 according to the present aspect.

In this watermark setting dialog 140, the portions similar to those of the setting dialog 100 as described above with relation to FIG. 7A are given the same designations and the description thereof is omitted.

Incidentally, although not shown, when a user presses down an edit button 104 or a new button 105 provided in the watermark setting dialog 140, there is displayed a watermark editing dialog which is similar to the above-mentioned watermark editing dialog 120 as shown in FIG. 7B.

As shown in FIG. 3, in the watermark setting dialog 140 according to the present aspect, there is provided a check box 142 which allows the user to choose the item "Store overlay".

As shown in FIG. 3, when the "Store Overlay" selection is checked off in the check box 142, under the control (according to the print control process) (see FIG. 4) of the printer driver 14a which is started in accordance with instructions for execution of printing given by the user, a bit map file for a watermark is created from the printing image of a document (characters) or from images inputted by the user himself or herself, and a given display title 108 is then given to the bit map file, before the bit map file is stored Next, description will be given below of the print control process to be executed by the PC 10 according to the printer driver 14a in the above-structured print system 1 with reference to flow charts respectively shown in FIGS. 4 and 5. Specifically, FIG. 4 is a flow chart showing the print control process to be executed by the PC 10, whereas FIG. 5 is a flow chart showing a print process to be executed in the print control process shown in FIG. 4.

In the print control process shown in FIG. 4, when the user instructs for print execution through a given operation, the print control process is started with the actuation of the printer driver 14a. Specifically, it is first checked whether the check box 142 specifying the item "Store Overlay" in the watermark setting dialog 140 (see FIG. 3) has been checked off or not (S401).

When, as a result of execution of process in S401, it is confirmed that the check box 14 has been checked off (S401: Yes), there is created a printing image corresponding to one page (S402) and a bit map file is created from the thus created printing image (S403).

After the process ends in S403, there is obtained a piece of setting retaining information (see FIG. 2) about each of the watermarks stored in the setting retaining information memory 14b. The obtained setting retaining information is referred to and a new display title 108 which is not present in the present setting retaining information is decided (S405).

Thus, as a result of execution of the process in S405, there is automatically applied a display title 108, which has never been used in the setting retaining information memory 14b, to the bit map image to be stored as a new watermark.

Although a rule applied when the display title 108 is decided in S405 is not limited to any particular rule, for example, when, in the respective watermarks stored in the setting retaining information memory 14b, a display title 108 corresponding to a bit map image is distinguished by a number following the term "Form Overlay" such as "Form Overlay 1", "Form Overlay 2", . . . , a new display title 108 can be decided by incrementing the number.

In this manner, when applying a display title 108 to the bit map image automatically, by applying the display title 108 sequentially according to a given rule, the control of a watermark (a bit map file for a watermark) by the user can be facilitated.

After the process ends in S405, while referring to the setting retaining information obtained in S404, a new bit map file name which is not present in the setting retaining information is decided (S406). Thus, as a result of execution of the process in S406, a bit map file name which has never been used in the setting retaining information memory 14b is automatically given to the file of a bit map image to be stored as a new watermark (a bit map file).

In this case as well, similar to a case where the display title 108 is decided in S405, a rule applied when the bit map file name is decided is not limited to any particular rule. For example, when the bit map file name is distinguished by a number following the term "overlay" such as "overlay001.bmp", "overlay002.bmp", . . . , a new file name can be obtained by incrementing the number.

When the bit map file name is decided in S406, its corresponding bit map file (the bit map file created in S403) is retained (stored) in the watermark image memory 14c in the form of the decided bit map file name (S407). The watermark image memory 14c is automatically resized to a size that can be used as a watermark.

After the process ends in S407, new pieces of setting information, that is, the display title 108 decided in S405, the destination path of the stored location of the bit map file retained in S407, and the initial setting values of other items are added to the setting retaining information memory 14b (S408).

Therefore, after the user checks off the check box 142 in the watermark setting dialog 140 (see FIG. 3), when the user gives instructions for execution of printing, the file of the watermark data (the bit map file) is created from the printing image of a document (characters) or images to be printed as a result of the process in S402 to S408, and the thus created bit map file is stored as a usable watermark.

In other words, in order to store characters or images inputted by the user himself or herself in a printer driver as a new watermark, there has previously been necessary to execute a troublesome operation such as an operation for capturing a page to be created. On the other hand, according to the printer driver 14a of the present aspect, when the instructions for execution of printing is given in a state where the check box 142 is checked off, the processes in S402 to S408 are carried out. Therefore, the user is able to store a new watermark in the printer driver 14a with similar ease as in a case where the characters or images inputted by the user himself or herself are printed.

After the process ends in S408, it is confirmed whether a next page is present or not (S409), and if the next page is present (S409: Yes), the printing image of the next page is retained in the watermark memory 14c as a bit map image for a watermark by repeating the process in S402 to S409, and a piece of new watermark setting information composed of the present watermark image is added to the setting retaining information memory 14b. When it is found in S409 that no next page is present, the present print control process is ended.

Thus, when creating a bit map file for a watermark using the printer driver 14a according to the invention, for characters and images corresponding to the plurality of pages, a number of watermarks corresponding to the total number of pages can be stored in the printer driver 14a at once.

Therefore, without creating the bit map files one at a time or without specifying the existing bit map files one at a time, the user is able to store a plurality of watermarks at once.

On the other hand, if it is found that the check box 142 is not checked off (S401: No), then a process shown in FIG. 5 (S410) is executed, thereby ending the present print control process.

As shown in FIG. 5, in the process (S410), first, print images corresponding to one page are created (S501), and it is confirmed whether or not the watermark printing is valid by determining whether the check box 106 is checked off (S502).

As a result of execution of the process in S502, if the watermark printing is valid (S502: Yes), the setting retaining information corresponding to the specified display title 108 of the display titles 108 arranged in the box 107 is read out from the setting retaining information memory 14b (S503).

After the process ends in S503, a bit map file specified by a path included in the thus read-out setting retaining information is read out (S504), the image data of the read-out bit map file and the printing image created in S501 are synthesized together into a synthesized image (S505), and print data are created from the synthesized image (S506).

On the other hand, if the watermark printing is invalid, that is, the check box 106 is not checked off (S502: No), then the processes in S503 to S505 are skipped over and the process goes to S506. Therefore, when the check box 106 is not checked off, in S506, printing data are created from the printing image created in S501.

After executing of the process in S506, the created printing data are transmitted to the printer 20 (S507). After executing the process in S507, printing according to the printing data is executed on a recording medium by the printer 20 and the thus obtained printed matter is then discharged from the printer 20.

Accordingly, when the check box 106 is checked off, the printed matter with a watermark added thereto is discharged from the printer 20 (S503 to S505). When the check box 106 is not checked off, ordinary printed matter is discharged from the printer (that is, printed matter composed of a recording medium on which a document or images inputted by the user are printed).

After the process ends in S507, it is confirmed whether or not a next page is present (S508). If the next page is present (S508: Yes), by repeating the process S501 to S508, printing data corresponding to the next page are transmitted to the printer 20. Accordingly, the corresponding printed matter is discharged from the printer 20.

As a result, if no next page is present (S508: No), the present print process is ended.

Thus, when the user gives an instruction for execution of printing without checking off the check box 142 in the watermark setting dialog 140 (see FIG. 3), through the present print process (S410), printing data corresponding to whether or not the check box 106 is checked off are created and are then transmitted to the printer 20.

As has been described heretofore, according to the printer driver 14a to be executed by the PC 10 used in the print system 1 of the present aspect, a new watermark can be stored in the printer driver 14a with similar ease as to a case where a print process is carried out.

Also, according to the printer driver 14a of the present aspect, when a printing execution instruction is given in a state where the check box 142 is checked off, a bit map file for a watermark is created automatically from a document (characters) or images to be printed and is then stored. Therefore, operations of a user finding out a bit map file to be desired for use as a watermark from among bit map files previously stored in any of the memories included in the PC 10 can be omitted.

Further, in the case of a bit map file created by the printer driver 14a according to the present aspect, since the stored location of the present bit map file is a specific memory (that is, the watermark image memory 14c), the user is able to easily locate the stored location of a bit map file for a watermark, thereby being able to reduce time and labor necessary for file management.

Incidentally, the processes in S402 and S501 correspond to a printing data creating step; the process in S504 corresponds to a reading out step; the processes in S505 and S506 correspond to a print data creating step; and the process in S507 corresponds to an outputting step.

Also, the process in S403 corresponds to a reading step, while the processes in S404 to S408 correspond to a storing step.

The expression "Refer to obtained setting retaining information" in S405 and in S406 corresponds to a confirming step; the expression "Decide new bit map file name" in S406 and the process in S407 correspond to a storing step; the expression "Decide new display title" in S405 corresponds to a display title adding step; and the process in S408 corresponds to a linking step.

Although description has been given heretofore with reference to the aspect of the invention, the invention is not limited to the above-mentioned aspects but can be easily understood that various improvements and modifications are also possible without departing from the subject matter or scope of the invention.

For example, in the above-mentioned aspect, the image data for a watermark are filed in the form of a bit map type file (bit map file). However, the file type is not limited to the bit map file but there can also be used other file types such as a JPEG type and a GIF type.

Although the image data for a watermark are composed of the bit map data in the above-mentioned aspect, they may also be composed of vector data.

Also, in S407 in the above-mentioned aspect, the stored location of the created bit map file is decided to be a specific memory (watermark image memory 14c). However, it is also possible to employ a structure where, when storing a watermark, the stored location of the bit map file can be decided by the user specifying a folder.

Further, in the above-mentioned aspect, there is employed a structure in which all pieces of setting retaining information (see FIG. 2) corresponding to the respective watermarks to be stored in the setting retaining information memory 14b are decided automatically. However, it is also possible to employ another structure in which, when storing watermarks, the user can input the respective values of the setting retaining information.

Moreover, in the above-mentioned aspect, the data and instructions are input to the PC 10 through the user operation. However, they may also be input through input methods other than the user operation method. For example, the data and instructions may be automatically input to the PC 10 by the PC 10 itself.

Figure 6:
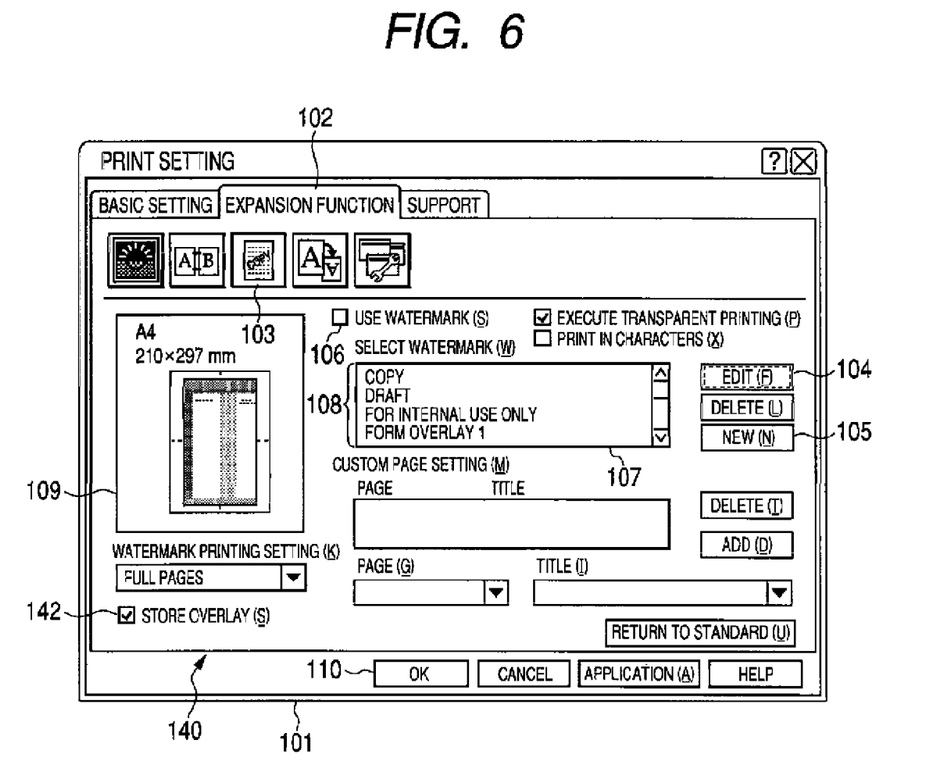
FIG. 6 is a screen view of a watermark setting dialog to be displayed on an LCD in the print system according to another aspect of the invention.

Moreover, when storing watermark data as watermarks, the user may uncheck a check box 106 in the watermark setting dialog 140 as shown in FIG. 6.

What is claimed is:

1. A non-transitory computer-readable medium storing software instructions for execution by a computing device, the software instructions for enabling a computer connected to a printing apparatus to perform predetermined operations comprising:

creating printing data based on at least one of a character and an image;

reading out watermark data chosen from a plurality of watermark data, each of the watermark data corresponding to each of a plurality of image files stored in a memory;

synthesizing the read-out watermark data and the created printing data so as to generate output data;

outputting the generated output data to the printing apparatus; and when an instruction is given to create a new image file based on the created printing data, instead of reading out the watermark data and synthesizing the read-out watermark data and outputting the generated output data to the printing apparatus, performing the following:

creating a new image file of the created printing data for a new watermark; and storing the created new image file in the memory, wherein a plurality of new image files are created, each new image file corresponding to the printing data on each of a plurality of pages, and wherein each new image file is stored in the memory individually.

2. The print control program product according to claim 1, wherein the plurality of image files stored in the memory includes the created new image file.

3. The non-transitory computer-readable medium according to claim 1, wherein the storing step further comprises:

extracting file names and titles from the memory, each file name specifying the image files stored in the memory, each title being linked with each file name;

adding a new file name to the created new image file, the new file name being unique among the extracted file names of the image files stored in the memory; and adding a new title to the created new image file, the new title being unique among the extracted titles of the image files stored in the memory.

4. The non-transitory computer-readable medium according to claim 3, wherein the storing step further comprises:

linking the new title with the new file name.

5. A non-transitory computer-readable medium storing software instructions for execution by a computing device, the software instructions for enabling a computer connected to a printing apparatus to perform predetermined operations comprising:

creating printing data based on at least one of a character and an image;

reading out watermark data chosen from a plurality of watermark data, each of the watermark data corresponding to each of a plurality of image files stored in a memory;

synthesizing the read-out watermark data and the created printing data so as to generate output data;

outputting the generated output data to the printing apparatus; and when an instruction is given to create a new image file based on the created printing data, instead of reading out the watermark data and synthesizing the read-out watermark data and outputting the generated output data to the printing apparatus, performing the following:

creating a new image file of the created printing data for a new watermark; and storing the created new image file in the memory, wherein the storing step further comprises:

extracting file names and titles from the memory, each file name specifying the image files stored in the memory, each title being linked with each file name;

adding a new file name to the created new image file, the new file name being unique among the extracted file names of the image files stored in the memory; and adding a new title to the created new image file, the new title being unique among the extracted titles of the image files stored in the memory.

6. The non-transitory computer-readable medium according to claim 5, wherein the storing step further comprises:

linking the new title with the new file name.

7. A method for executing print control process for a printing apparatus, the method comprising:

creating printing data based on at least one of a character and an image;

reading out watermark data chosen from a plurality of watermark data, each of the watermark data corresponding to each of a plurality of image files stored in a memory;

synthesizing the read-out watermark data and the created printing data so as to generate output data;

outputting the generated output data to the printing apparatus;

when an instruction is given to create the image file based on the created printing data, instead of reading out the watermark data and synthesizing the read-out watermark data and outputting the generated output data to the printing apparatus, performing the following:

creating a new image file of the created printing data for a new watermark; and storing the created new image file in the memory, such that creating the new image file includes creating a plurality new image files, each new image file corresponding to the printing data on each of a plurality of pages; and such that storing the created new image file includes storing each new image file in the memory individually.

8. The method according to claim 7, wherein the storing step further comprises:

extracting file names and titles from the memory, each file name specifying the image files stored in the memory, each title being linked with each file name;

adding a new file name to the created new image file, the new file name being unique among the extracted file names of the image files stored in the memory; and adding a new title to the created new image file, the new title being unique among the extracted titles of the image files stored in the memory.

9. The method according to claim 8, wherein the storing step further comprises:

linking the new title with the new file name.

10. The method according to claim 7, wherein the plurality of image files stored in the memory includes the created new image file.

11. A computing system connected to a printing apparatus, the computing system comprising:
- a memory; and
- a controller configured to:
    - create printing data based on at least one of a character and an image;
    - read out watermark data chosen from a plurality of watermark data, each of the watermark data corresponding to each of a plurality of image files stored in the memory;
    - synthesize the read-out watermark data and the created printing data so as to generate output data;
    - output the generated output data to the printing apparatus; and
    - when an instruction is given to create the image file based on the created printing data, instead of reading out the watermark data and synthesizing the read-out watermark data and outputting the generated output data to the printing apparatus, performing the following:
        - create a new image file of the created printing data for a new watermark; and
        - store the created new image file in the memory,
    - wherein the controller is further configured to:
        - create a plurality of new image files, each new image file corresponding to the printing data on each of a plurality of pages, and
        - store each new image file in the memory individually.

12. The computing system according to claim 11, wherein the plurality of image files stored in the memory includes the created new image file.

13. The computing system according to claim 11, wherein, when storing the created new image file in the memory, the controller is further configured to:
- extract file names and titles from the memory, each file name specifying the image files stored in the memory, each title being linked with each file name;
- add a new file name to the created new image file, the new file name being unique among the extracted file names of the image files stored in the memory; and
- add a new title to the created new image file, the new title being unique among the extracted titles of the image files stored in the memory.

14. The computing system according to claim 13, wherein the controller is further configured to:
- link the new title with the new file name.

* * * * *